(12) United States Patent
Kibben et al.

(10) Patent No.: US 10,987,718 B2
(45) Date of Patent: Apr. 27, 2021

(54) METHOD FOR PRODUCTION OF A SUPPORTING MEMBER AND A LADDER FRAME OR BOX FRAME

(71) Applicants: ThyssenKrupp Steel Europe AG, Duisburg (DE); thyssenkrupp AG, Essen (DE)

(72) Inventors: Martin Kibben, Dinslaken (DE); Thomas Flehmig, Ratingen (DE); Daniel Nierhoff, Mülheim a. d. Ruhr (DE); Lars Bode, Dusseldorf (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 88 days.

(21) Appl. No.: 16/444,552

(22) Filed: Jun. 18, 2019

(65) Prior Publication Data

US 2019/0388953 A1     Dec. 26, 2019

(30) Foreign Application Priority Data

Jun. 22, 2018    (DE) .................... 10 2018 210 174.4

(51) Int. Cl.
*B21D 47/01* (2006.01)
*B21D 51/10* (2006.01)
(Continued)

(52) U.S. Cl.
CPC ........... *B21D 47/01* (2013.01); *B21D 26/021* (2013.01); *B21D 37/10* (2013.01); *B21D 51/10* (2013.01);
(Continued)

(58) Field of Classification Search
CPC ....... Y10T 29/49622; Y10T 29/49625–49627; Y10T 29/49634; B62D 21/02–04; B21D 47/01; B21D 53/88; B21D 51/04; B21D 51/06; B21D 51/10; B21D 22/20; B21D 22/30
See application file for complete search history.

(56) References Cited

U.S. PATENT DOCUMENTS 2,838,322 A * 6/1958 Felts ...................... B62D 21/02
280/800
3,088,749 A * 5/1963 Schilberg ............... B62D 21/02
280/792
(Continued)

FOREIGN PATENT DOCUMENTS

DE     102007059251 A1 *  6/2009  ............. B21D 22/30

*Primary Examiner* — Matthew P Travers
(74) *Attorney, Agent, or Firm* — RMCK Law Group PLC

(57) ABSTRACT

The present invention concerns a method for production of a supporting member with an at least partially closed cross-section, having at least a first metal shell and a second metal shell which are connected together at least in portions in the longitudinal direction. The method includes a provision of at least a first and a second metal blank. At least a first and a second metal shell are produced from the respective first and second metal blanks. The first and second metal shells each have at least one floor with two protruding uprights spaced apart from each other and integrally connected to the floor. The first and second metal shells are positioned such that the uprights of the metal shells come into overlapping contact.

18 Claims, 5 Drawing Sheets

(51) Int. Cl.
*B21D 26/021* (2011.01)
*B62D 25/08* (2006.01)
*B21D 53/88* (2006.01)
*B62D 21/02* (2006.01)
*B21D 37/10* (2006.01)

(52) U.S. Cl.
CPC ............. *B21D 53/88* (2013.01); *B62D 25/08* (2013.01); *B60G 2206/81* (2013.01); *B62D 21/02* (2013.01)

(56) References Cited

U.S. PATENT DOCUMENTS

| | | | | |
|---|---|---|---|---|
| 3,105,701 | A * | 10/1963 | Schilberg | B62D 21/02 |
| | | | | 280/790 |
| 4,098,350 | A * | 7/1978 | Eftefield | E02F 3/80 |
| | | | | 172/776 |
| 4,203,617 | A * | 5/1980 | Bowman, Jr. | B62D 21/02 |
| | | | | 280/797 |
| 4,674,770 | A * | 6/1987 | Inagaki | B62D 21/02 |
| | | | | 280/797 |
| 2003/0184075 | A1* | 10/2003 | Freeman | B62D 21/00 |
| | | | | 280/797 |
| 2006/0125226 | A1* | 6/2006 | Barbat | B62D 21/152 |
| | | | | 280/784 |
| 2007/0035118 | A1* | 2/2007 | Ni | B21D 53/88 |
| | | | | 280/797 |
| 2008/0299352 | A1* | 12/2008 | Matsuda | B21K 1/12 |
| | | | | 428/174 |
| 2010/0133724 | A1* | 6/2010 | Flehmig | B21D 22/21 |
| | | | | 264/294 |
| 2010/0244497 | A1* | 9/2010 | Honda | B62D 21/02 |
| | | | | 296/205 |
| 2011/0298245 | A1* | 12/2011 | Jarocki | B62D 33/02 |
| | | | | 296/193.07 |
| 2012/0018973 | A1* | 1/2012 | Fujii | B60G 3/20 |
| | | | | 280/124.134 |
| 2018/0009050 | A1* | 1/2018 | Tokita | B23K 9/0026 |
| 2019/0256146 | A1* | 8/2019 | Obara | B62D 21/15 |

* cited by examiner

METHOD FOR PRODUCTION OF A SUPPORTING MEMBER AND A LADDER FRAME OR BOX FRAME

FIELD

The present invention concerns a method for production of a supporting member with an at least partially closed cross-section, having at least a first metal shell and a second metal shell which are connected together at least in portions in the longitudinal direction.

BACKGROUND

Longitudinal and/or cross-members of ladder frames or box frames, which are preferably used in pick-ups and/or SUVs, are composed from substantially U-shaped profiles which each have at least one floor with two protruding uprights spaced apart from each other and integrally connected to the floor, running substantially parallel to each other. Optionally, protruding flanges integrally connected to the uprights may adjoin the uprights. Two U-shaped profiles are inserted into each other such that the uprights of the profiles overlap in portions, wherein the overlap joint is preferably welded in the longitudinal direction of the profiles and provides a closed profile which can be used as a longitudinal and/or cross-member with a closed cross-section for production of a ladder or box frame. The profiles or their uprights must be oriented parallel to each other at least in the region of the overlap, so that the U-shape has an opening angle of substantially 0° at least in the region of the overlap. The term "ladder frame" means a vehicle frame in the vehicle structure which in particular receives the axles, engine, transmission and vehicle superstructure, usually comprises two longitudinal bars with several cross struts arranged in between, and has the form of a ladder. A "box frame" is a vehicle frame in the vehicle structure which in particular receives the axles, engine, transmission and vehicle superstructure, and usually comprises two longitudinal bars with at least two cross struts arranged in between.

The U-shaped profiles are conventionally produced by deep-drawing or embossing with bending or folding, wherein an open U-shaped profile or component is deep-drawn from a preferably flat plate which is clamped in the deep-drawing tool between a retainer or metal holder and a drawing die or die contact face, and is then drawn into a lower die via an upper die. The disadvantages with conventional deep-drawing are in particular the component's tendency to spring-back due to an uneven stress state over the metal thickness after drawing, and sensitivity to batch fluctuations, so that it is not possible to set an opening angle of substantially 0° without additional complex measures. Thus for example, the spring-back to be expected is taken into account in the design of the deep-drawing tool in that, via classic compensation measures such as for example over-bending the transitional radius corresponding to the transition between the floor and the upright, and/or by the use of spherical tool action faces, the expected spring-back can be worked into the tool in the opposite direction in order to give a component which is as dimensionally accurate as possible after relief of the uneven stress state. Since these measures are not sufficient, in particular for high-strength materials and in particular in combination with low metal thicknesses, often straightening processes must be performed after deep-drawing in order to achieve the necessary dimensional accuracy in further operations. Furthermore, batch fluctuations also have a negative effect on the tolerance specifications, wherein after a change of material batch, for example if a steel material is used and the coil is changed, the dimensional accuracy of the components can no longer be observed. As a consequence, complex measures must be taken to set up the straightening processes, and/or the deep-drawing process—here in particular the retaining force—must be matched individually to the new batch. If dimensional anomalies remain, these must be compensated via complex stress concepts, by means of which two U-shaped components (half-shells) to be joined into a closed profile are aligned to each other before the joining process. The absence of constant tribological conditions in the tool also leads to undesirable deviations from the nominal geometry of the finished component. As well as the above-mentioned advantages and disadvantages of conventional deep-drawing processes, with components produced in this way, normally the so-called drawing edges must be cut away after forming. This cutting usually constitutes one or more separate operations which require their own tooling and own logistics system. Also, the material utilisation is thereby frequently unfavourable, so further costs result.

For conventional deep-drawing, in U-shaped profiles normally an opening angle of the uprights of around 6° and, for high-strength steel materials with a greater spring-back tendency, around 8° is tolerated. The opening angle creates a necessary clearance for compensating for the spring-back in the tool without undercut.

If the uprights on U-shaped profiles run substantially parallel to each other, because of the undercut capacity, such compensation possibilities cannot be implemented in the tooling as described above or only with complex tooling functions. Generally however, following deep-drawing, dimensional accuracy must be obtained with complex straightening operations. A further possibility for compensating for spring-back or the upright rebound is the use of so-called stiffening fields which are imprinted into the uprights and/or transitional radii in targeted fashion. Profiles or components with stiffening fields however have the drawback that the stiffening fields act as initial beading for the folding of the components or profiles under axial load, whereby the crash performance of the supporting members is negatively influenced.

For the production of longitudinal and/or cross-members which are in turn provided and used for production of platforms for vehicles, there is a need for simple and less complex production of substantially U-shaped profiles or components with precisely aligned uprights, substantially free from spring-back, in order then to be able to weld two profiles or components, as far as possible without subsequent straightening operations in the overlap joint, into a supporting member with an at least partially closed cross-section in the longitudinal direction, wherein the above-mentioned conventional compensation measures are not applied

SUMMARY

A method for production of a supporting member with an at least partially closed cross-section, having at least a first metal shell and a second metal shell which are connected together at least in portions in the longitudinal direction is provided. The method comprises the following steps:

provision of at least a first and a second metal blank, production of at least a first and a second metal shell from the respective first and second metal blanks, wherein the first and second metal shells each have at least one floor with two protruding uprights spaced apart from each other and integrally connected to the floor, positioning of the at least first and second metal shells such that the uprights of the metal shells come into overlapping contact at least in portions and, forming an at least partially closed cross-section, are connected together at least in portions in the longitudinal direction so as to form a supporting member.

The invention furthermore concerns a method for production of a ladder frame or box frame for a vehicle with at least four supporting members, wherein the ladder or box frame comprises at least one supporting member with an at least partially closed cross-section with at least a first and a second metal shell which are connected together at least in portions in the longitudinal direction, wherein the at least first and second metal shells each comprise at least one floor with two protruding uprights spaced apart from each other and integrally connected to the floor.

The invention is therefore based on the object of creating a method for production of a supporting member, and a method for production of a ladder frame or box frame for a vehicle with at least one supporting member produced in this way, with which straightening operations may be substantially omitted and a relatively simple process can be implemented.

This object is achieved according to a first teaching by a method with the features of claim 1.

According to the invention, it is provided that firstly a preform having a floor with two uprights adjoining the floor is produced from at least the first and/or second metal blank, wherein at least in regions, surplus metal material is provided in particular in the preform, and then the preform at least in regions is subjected to compression-forming in order to produce the metal shells such that the uprights at least in portions have an opening angle of less than 6°, in particular less than 3°, preferably less than 2°.

It has been found that to produce the metal shell(s) by at least a two-stage process, in comparison with conventional deep-drawing for production of a metal shell, with relatively simple means firstly, in a first process, a preform with a floor with two uprights adjoining the floor is produced from a first and/or a second metal blank. The metal blank(s) may be cut out of a strip-like material or coil according to specifications. Preferably, at least as the first and/or second metal blank, a steel material is used with a tensile strength ($R_m$) of more than 350 MPa, in particular more than 400 MPa, preferably more than 500 MPa, preferably more than 600 MPa, and with a thickness of at least 0.8 mm, in particular at least 1.1 mm, preferably at least 1.5 mm, particularly preferably at least 1.9 mm, furthermore preferably at least 2.2 mm. Determination of the tensile strength is normal practice for the person skilled in the art. Alternatively, aluminum materials with corresponding mechanical values and material thicknesses may be used.

The preform may be produced in one or more steps by means of arbitrary or combinable shaping methods in the first process. As well as a forming step by deep-drawing for example, the preform production may also comprise multi-stage forming, comprising for example embossing of the floor to be produced and bending or folding of the uprights to be produced (embossing and bending, or embossing and folding). Arbitrary combinations of folding and or bending and/or stamping or embossing are also conceivable in one or more of the following operations. The deep-drawing may for example be carried out in one or more stages. If, in deep-drawing, the outer metal holder or retainer is omitted or is not involved in the shaping process, this is known as crash-forming. Preferably, on production of the preform, the uprights undergo substantially no alternating bending stresses, as would be the case for example from running the material over a drawing radius in conventional deep-drawing, so that the uprights can be produced without major form deviations, and in particular thereby a flowing of material between the uprights and the floor over the transitional regions can be substantially avoided.

The produced preform may in particular be regarded as a moulding without flange, as close to the final form as possible and corresponding as well as possible to the proposed finished part geometry, taking into account given peripheral conditions such as spring-back and forming capacity of the material used. As a result, at least in regions, surplus metal material is provided in the preform. In particular, in comparison with the metal shell, the preform has a substantially even distribution of surplus metal material, or surplus metal material is present in targeted fashion at least in regions in the floor and/or in the uprights and/or in the region between the upright and floor (transitional region). In particular, the targeted provision of surplus metal material is usually determined by simulation and/or trial and error. Surplus metal material means material addition at least in regions in the form of a length addition relative to the processing of the nominal geometry, in particular with constant material thickness, and not the provision of material in the form of thickening.

The preform is then subjected to compression-forming at least in regions for production of the metal shells, such that the uprights on the metal shell have at least in portions an opening angle of less than 6°, in particular less than 3°, preferably less than 2°, preferably less than 1°, particularly preferably ideally 0°. At least in regions, the cross-section of the preform has an uneven stress state which, amongst others, in addition to the criteria above, leads to an undesirable batch-dependent spring-back, which is in particular amplified on the use of high-strength steel materials and in particular in combination with low material thicknesses, and revealed by a dimensional deviation, in particular a curved rebound or also a depression of the uprights, and/or by global twisting of the component. In particular, in combination with the surplus metal material, by means of compression stress overlay, the uneven stress state and in particular the dimensional deviation of the uprights in the preform from compression-forming may be straightened in a second process and hence transferred to the nominal geometry. Compression-forming or compression stress overlay takes place in particular in the direction of the metal plane as part of flattening and/or calibration, wherein the preform is placed in a flattening and/or calibration tool which has the nominal geometry of the metal shell, or the active faces of the tool correspond to the nominal geometry of the metal shell, so as in particular also to compensate for fluctuations resulting from batch change and/or wear on the tools for producing the preform and/or the tribological properties of tools and materials. In particular, adaptations to the tool active faces to compensate for spring-back are no longer required. The uprights of the metal shells at least in portions have an opening angle of less than 6°, wherein in particular the uprights of the metal shells have, in several portions in the longitudinal direction, preferably completely in the longitudinal direction, an opening angle of less than 6°, in particular less than 3°, preferably less than 2°, preferably less than 1°, particularly preferably ideally 0°.

The term "flattening/calibration" in particular means final forming or end forming of the metal shells to nominal geometry, which can be achieved for example by one or more pressing processes. The resulting, substantially finally formed metal shells may in particular be regarded as end-formed metal shells. However, it is possible that the substantially finally formed metal shells may be subjected to further processing steps modifying the metal shells, such as the application of connecting holes, the bending of face flanges, the production of collars and/or an edge trimming in regions. However, the aim is to structure the metal shells such that substantially no further forming steps are required.

With production of such metal shells, it is possible without complex straightening operations to produce profiles or supporting members with an at least partially closed cross-section from at least two metal shells which are connected together at least in portions in the longitudinal direction. In particular, high-strength steel materials may be used with a tensile strength of at least 350 MPa, in particular at least 400 MPa, preferably at least 500 MPa, preferably at least 600 MPa, particularly preferably at least 700 MPa, for production of metal shells for profiles or supporting members with at least partially closed cross-section, wherein these materials could not previously be used because of the uncontrollable spring-back effects. Thus with increasing tensile strength, the material thickness can be reduced for the same performance, so that in the design of a component with the same performance and reduced material thickness, the weight of the component can also be reduced. Preferably, the at least partial connection takes place via a substance-bonded, in particular welded connection, particularly preferably via a MAG welded connection. Further preferably, the metal shells are connected together continuously in the longitudinal direction and define a cross-section which is in particular closed completely in the longitudinal direction.

In particular, further advantages of a metal shell with uprights which have at least in portions an opening angle of less than 6°, in particular less than 3°, preferably less than 2°, preferably less than 1°, particularly preferably ideally 0°, are:

optimal use of installation space,
easy connection of attachments and/or internal reinforcing parts,
increased stiffness,
optimal load paths in the event of a crash,
simple joining with tolerance compensation in overlap joint,
minimal material usage due to omission of edge trimming,
optimal support of material in the uprights during the compression-forming process.

Alternatively or additionally, surplus metal material may be present in targeted fashion at least in regions in the preform, which on at least regional compression-forming leads to a thickening of at least portions of the edge of the uprights of the metal shells in the longitudinal direction. Firstly, micro-cracks at the edges, resulting from the at least partial thickening of the edge(s) of the upright(s) of the metal shell(s) during punching of the metal blank in particular from a coil, can be shaped; secondly, by the thickening of the edge, a gap can be set in the overlap region which advantageously in particular allows degassing (degassing gap) and substantially faultless welding. The geometry of the thickening of the edge may be arbitrary, for example mushroom- or wedge-shaped.

In particular, the first and/or second metal shell has uprights of different heights. Depending on design, the metal shell need not be symmetrical or mirror-symmetrical along an axis of symmetry, wherein in particular the uprights need not be oriented substantially perpendicularly (at an angle of around) 90°) to the floor. Rather, asymmetrically formed metal shells with a floor and uprights of different heights may be used for the production of the supporting members, wherein alternatively or additionally the uprights may be oriented at an acute or obtuse angle to the floor. In the longitudinal direction, the width of the floor and the height of the upright(s) of the at least first and/or second metal shell may vary individually. In this way, in particular a supporting member can be produced which may have a cross-section which varies in the longitudinal direction and is at least partially and preferably completely closed.

In particular, the supporting member comprises at least two metal shells nesting into or adjoining each other via the respective uprights, wherein the uprights run parallel to each other at least in portions in the overlap region for the joining process. This design facilitates the connection between the metal shells, in particular when the uprights stand in flat contact in the overlap region. The remaining region of the uprights running from the overlap region in the direction of the floor may be configured individually, for example have oblique uprights which protrude at an obtuse and/or acute angle from the floor, whereby in particular a supporting member can be produced which is adapted to the load and installation space situation, with corresponding, in particular variable, cross-sectional geometry, in particular in the longitudinal direction.

According to one embodiment, the opening angles of the uprights of the first metal shell and the second metal shell are deliberately designed or set differently at least in portions, wherein the first metal shell with its uprights is nested into the second metal shell with its uprights, and the uprights are connected together in the overlap region to produce a supporting member. To ensure contact of the uprights in the overlap region or to reduce or completely avoid the stress application, for example the opening angle of the uprights of the first metal shell which engages in the uprights of the second metal shell is larger than the opening angle of the uprights of the second metal shell. For the insertion or nesting, the uprights of the first shell are compressed. When the joining position is reached, the uprights of the first metal shell are again load-relieved, whereby they come into contact with the uprights of the second metal shell in the overlap region and in particular form a closed contact face.

According to a second teaching, the invention concerns a method for production of a ladder frame or box frame for a vehicle with at least four supporting members, wherein the ladder or box frame comprises at least one supporting member with an at least partially closed cross-section, with at least a first and a second metal shell connected to each other at least in portions in the longitudinal direction, wherein the at least first and second metal shells each comprise a floor with two protruding uprights spaced apart from each other and integrally connected to the floor, wherein at least one of the supporting members is produced according to the first teaching.

A ladder frame or box frame for a vehicle, in particular for receiving at least one vehicle component, such as for example chassis components and/or bodywork components of the vehicle, comprises at least four supporting members which are divided into at least two longitudinal members which run spaced apart from each other over their entire extension and are connected together by at least two cross-members attached by substance bonding, force fit and/or form fit. At least one of the supporting members, either the longitudinal member(s) and/or the cross-member(s), is produced according to the first teaching. In particular if the supporting member (longitudinal and/or cross-member), preferably if two of the supporting members, in particular the longitudinal members or cross-members, have an at least partially and in particular completely closed cross-section, the two other supporting members may have a different cross-section and in particular not be produced according to the first teaching. The ladder or box frame may comprise precisely two longitudinal members and precisely two cross-members, or more than two cross-members. Longitudinal members extend substantially in the vehicle longitudinal direction, and cross-members run substantially transversely to the vehicle longitudinal direction. The ladder or box frame may for example also be configured as a ladder frame for SUVs, pick-ups, utility vehicles, goods vehicles, special vehicles, buses, coaches, either with internal combustion engine and/or electric drive, trailers or semitrailers. Preferably, the cross-members are connected to the longitudinal members by substance bonding, in particular by welding, preferably with MIG, MAG, laser welding or soldering. For example, friction stir welding or resistance spot welding are also conceivable. Alternatively, a force-fit and/or form-fit connection is conceivable, in particular a rivet or bolt connection.

According to a third teaching, the invention concerns a vehicle, in particular an SUV, pick-up, utility vehicle, goods vehicle, special vehicle, bus, coach, with internal combustion engine and/or electric drive, trailer or semitrailer, comprising a ladder or box frame produced according to the second teaching.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The disclosure is explained in more detail below with reference to drawings. The same components carry the same reference signs. The drawings show.

DESCRIPTION

Figure 1:
FIG. 1 is a cross-section through a metal blank.

FIG. 1 shows in cross-section as an example a metal blank (1, 2) which has been unwound from a coil (not shown), trimmed to length and supplied for further processing. The metal blank (1, 2) preferably consists of a steel material, preferably a steel material with a tensile strength of at least 350 MPa. Alternatively, aluminum materials or other metals may be used. The metal blank may also be formed as a tailored product.

At least a first and a second metal blank (1, 2) are provided, from which respectively at least a first and a second metal shell (5, 6) are produced, wherein the first and second metal shells (5, 6) each comprise at least one floor (5', 6') with two protruding uprights (5", 6") spaced apart from each other and integrally connected to the floor (5', 6'). At least one upright of at least one metal shell may also have a flange (not shown here) protruding at least in portions integrally from the upright in the longitudinal direction.

In comparison with the prior art, according to the invention the at least first and/or second metal shell (5, 6) is produced in an at least two-stage process, wherein a preform (3, 4) having a floor (3', 4') with two uprights (3", 4") protruding from the floor (3', 4') is produced from at least the first and/or second metal blank (1, 2). The preform (3, 4) may be produced in a first process in one or more stages. Preferably, the preform is produced by a multistage forming, comprising for example embossing of the floor (3', 4') to be produced, combined with bending or folding of the uprights (3", 4") to be produced, or particularly preferably by so-called crash-forming.

In particular, at least in regions, the preform (3, 4) is provided with surplus metal material (7, 8), in particular by a length addition at least in portions in comparison with the processing of the nominal geometry of the metal shells (5, 6).

Figure 3:
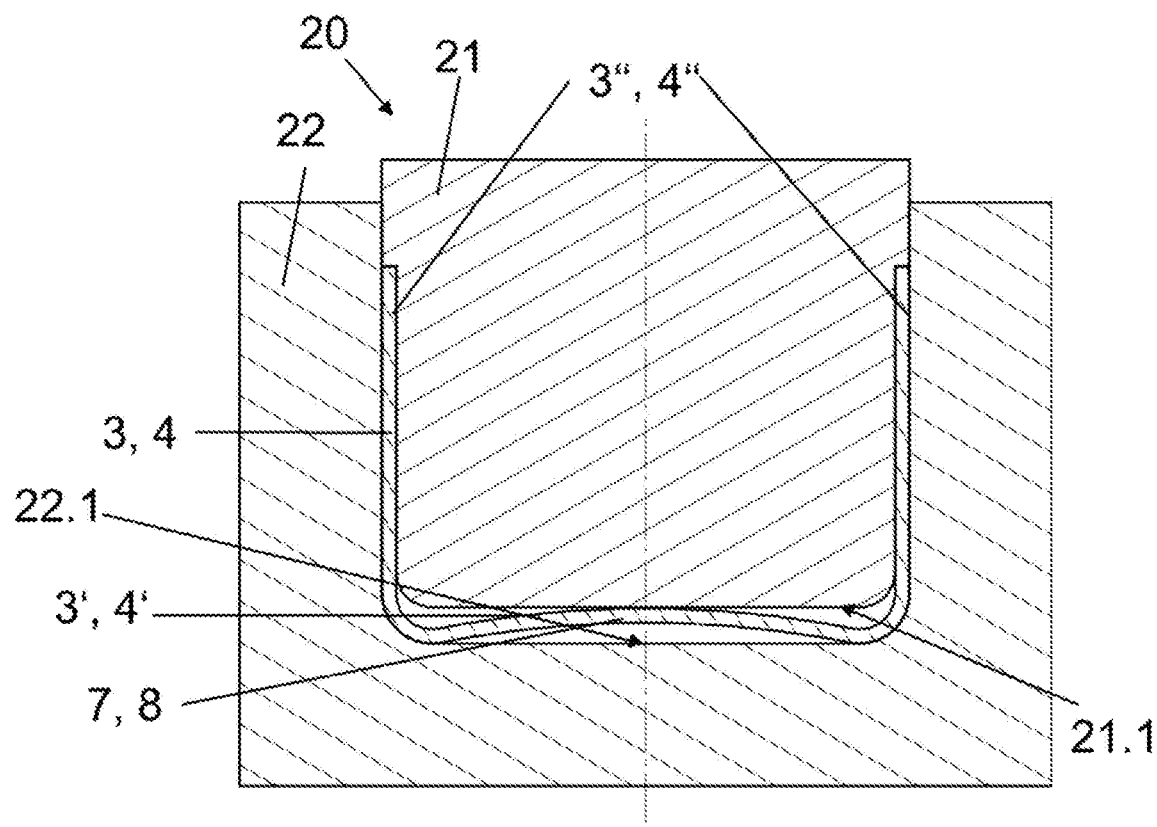
FIG. 3 is a cross-section through a flattening and/or calibration tool with inserted preform.
Figure 4:
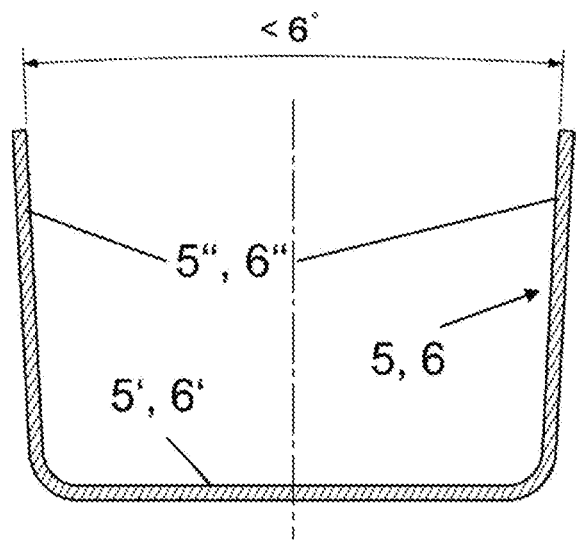
FIG. 4 is a cross-section through an exemplary embodiment of a metal shell.

Then the preform (3, 4) is subjected at least in regions to compression-forming in order to produce the metal shells (5, 6), such that the uprights (5", 6") at least in portions have an opening angle of less than 6°, in particular less than 3°, preferably less than 2° (see FIG. 4). Compression-forming or compression stress overlay takes place in particular in the direction of the metal plane as part of flattening and/or calibration, wherein the preform (3, 4) is placed in a flattening and/or calibration tool (20), and the active faces (21.1, 22.1) of the upper die (21) and lower die (22) correspond to the nominal geometry of the metal shells (5, 6) (see FIG. 3).

Figure 2:
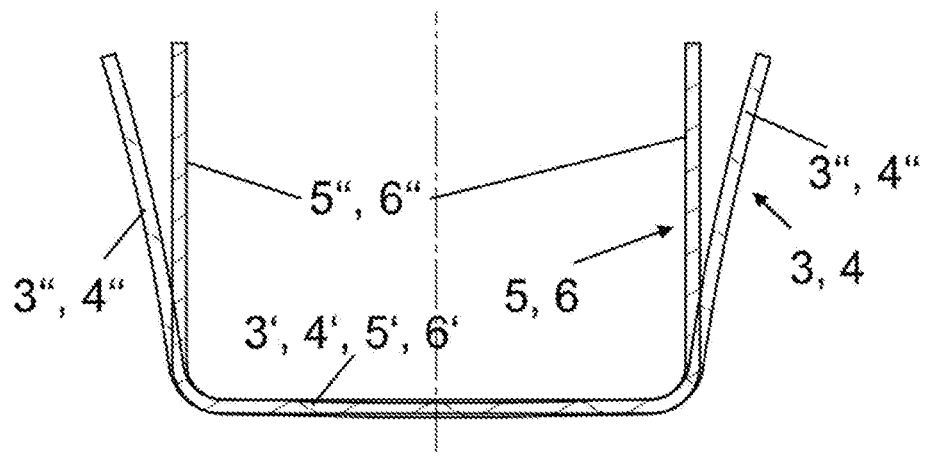
FIG. 2 is a cross-section through a preform and a metal shell.

FIG. 2 shows in cross-section the difference between a preform (3, 4) and a metal shell (5, 6) in final form, and in particular shows how, because of the uneven stress state, the uprights (3", 4") on the preform (3, 4) deviate from the nominal geometry which is produced precisely during compression-forming.

The at least first and second metal shells (5, 6) are positioned such that the uprights (5", 6") of the metal shells (5, 6) come into overlapping contact at least in portions, for example in the overlap region (12), and are connected together at least in portions to form an at least partially closed cross-section in the longitudinal direction (L) as a supporting member (10). Preferably, the metal shells (5, 6) are connected together, in particular by substance bonding, completely in the longitudinal direction (L) so that preferably a supporting member (10) with a completely closed cross-section is produced. The preferably substance-bonded connection in these examples is configured as a fillet weld seam (11). Other connecting forms are also conceivable but not shown.

In particular, only the at least first and/or second or preferably both metal shells (5, 6) undergo the at least two-stage process to produce metal shells (5, 6). Also, more than two metal shells may be used to produce a supporting member with a cross-section which is at least partially closed (in the longitudinal direction). Further parts, such as for example internal reinforcements and or other attachments (not shown), may be connected or attached to the supporting member (10).

FIGS. 5 to 10 show sectional depictions of various embodiments of the supporting member (10). The first and second metal shells (5, 6) have different geometries.

Figure 5:
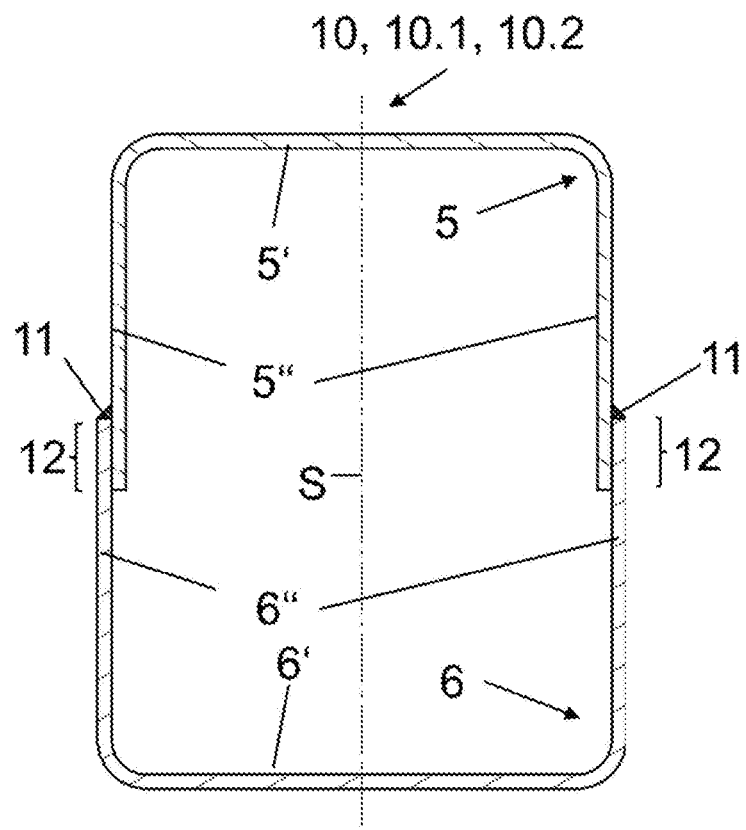
FIGS. 5 to 10 is a respective cross-section through various exemplary embodiments of supporting members.

In FIG. 5, the two metal shells (5, 6) are formed mirror-symmetrically along the axis of symmetry (S). The uprights (5") of the first metal shell (5) engage in the uprights (6") of the second metal shell (6), wherein the uprights (5", 6") come into overlapping contact at least in regions. The supporting member (10, 10.1, 10.2) comprises two metal shells (5, 6) nested into each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12).

Figure 6:
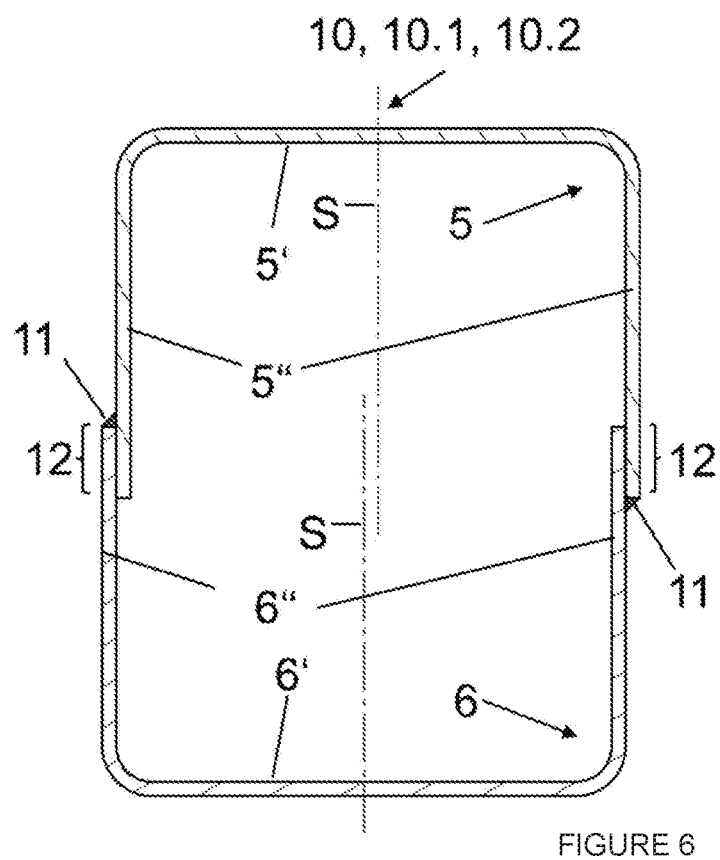

In FIG. 6, the metal shells (5, 6) correspond to the embodiment in FIG. 5 with the difference that the supporting member (10, 10.1, 10.2) comprises two metal shells (5, 6) adjoining each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12).

Figure 7:
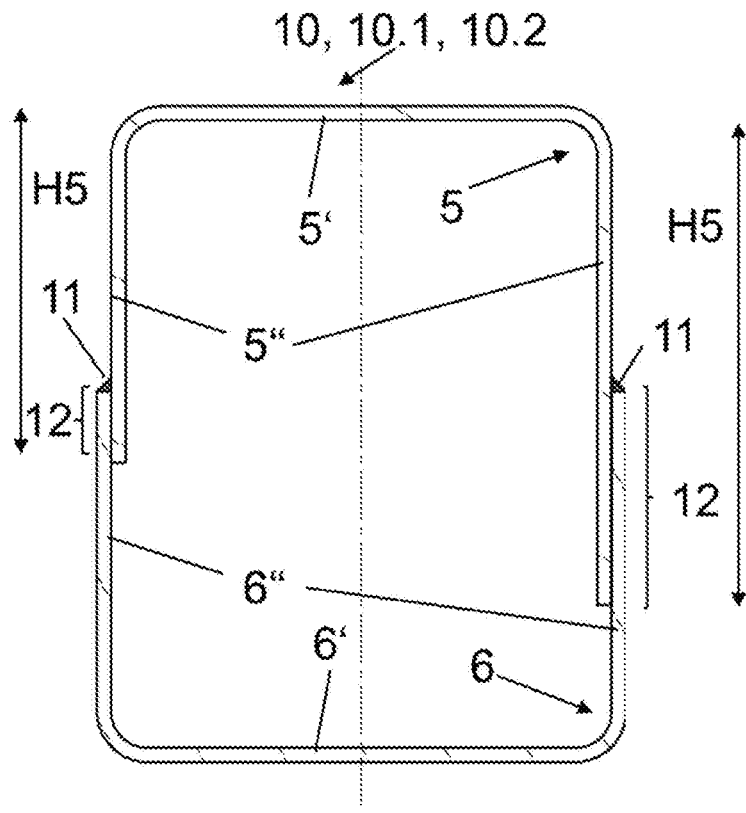

In FIG. 7, the first metal shell (5) has uprights (5") of different heights (H5), wherein the uprights (6") of the second metal shell (6) are however formed with the same height. Thus one side—in this view the right-hand side—of the supporting member (10, 10.1, 10.2) has a larger overlap region (12) than the left side. The supporting member (10, 10.1, 10.2) comprises two metal shells (5, 6) nested into each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12).

Figure 8:
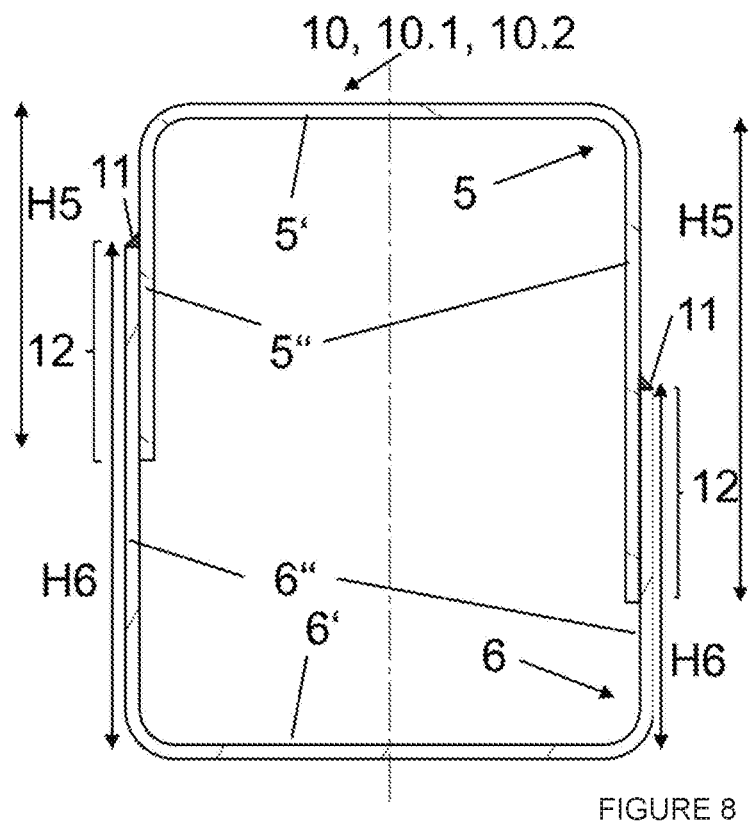

In FIG. 8, both the first metal shell (5) and the second metal shell (6) have uprights (5") of different heights (H5, H6). In particular, the dimensioning of the second metal shell (6) may correspond to the first metal shell (5), so that the same parts can be used for production of the supporting member (10, 10.1, 10.2), i.e. the first metal shell (5) geometrically corresponds to the second metal shell (6). Thus the overlap regions (12) may be configured to be the same size. The supporting member (10, 10.1, 10.2) comprises two metal shells (5, 6) nested into each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12).

Figure 9:
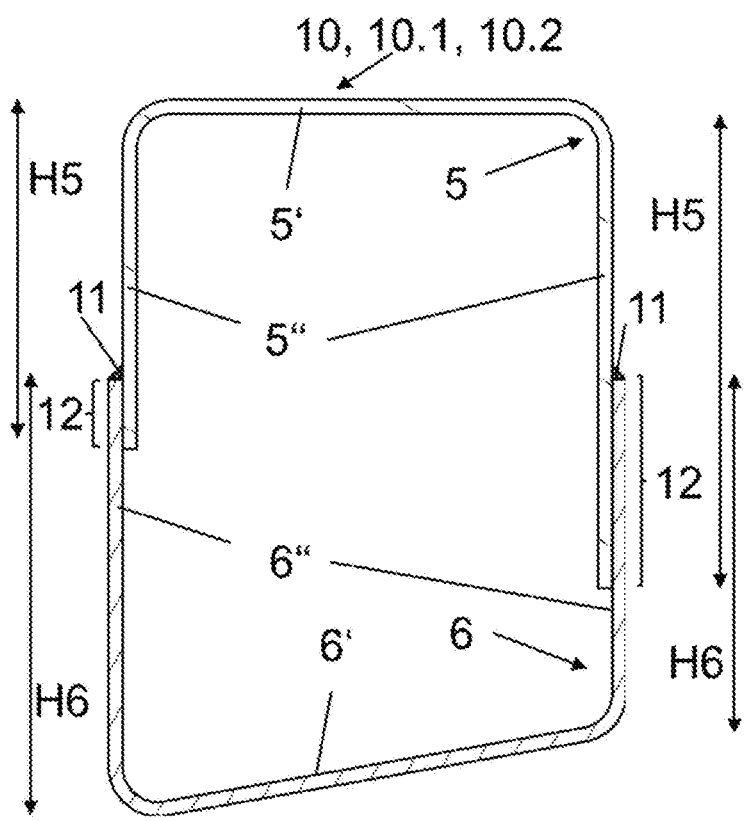

In FIG. 9, the first metal shell (5) has uprights (5") of different heights (H5). The second metal shell (6) also has uprights (6") of different heights (H6), wherein the uprights (6") are not configured to be perpendicular to the floor (6') of the metal shell (6), as in the other embodiments, but are oriented at obtuse or acute angles thereto, so that in the depiction shown, the floor (6') is sloping, rising from the left to the right. The supporting member (10, 10.1, 10.2) comprises two metal shells (5, 6) nested into each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12).

Figure 10:
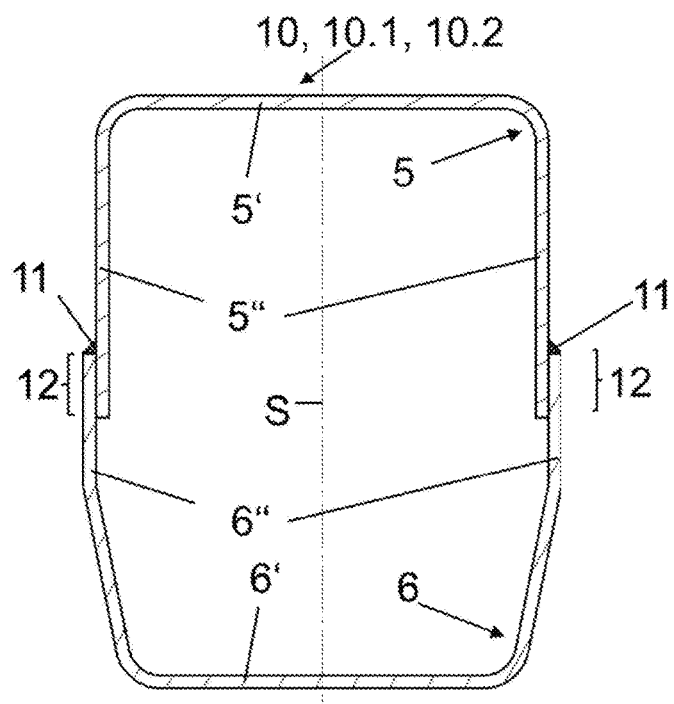

In FIG. 10, the two metal shells (5, 6) are designed mirror-symmetrically along the axis of symmetry (S). The uprights (5") of the first metal shell (5) are however of the same height, while the uprights (6") of the second metal shell (6) are configured running at an angle, in particular pointing outward, in the region directly adjacent to the floor (6'), and run perpendicular to the floor (6') in the further course in the direction of the edges of the upright (6"). The supporting member (10, 10.1, 10.2) comprises two metal shells (5, 6) nested into each other via the respective uprights (5", 6") and connected together, preferably completely in the longitudinal direction (L), by substance bonding in the overlap region (12) via a weld seam (11), wherein the uprights (5", 6") run parallel to each other at least in portions, in particular completely in the overlap region (12) for the joining process.

Furthermore, the invention concerns a method for producing a ladder frame or box frame (30) for a vehicle (not shown) with at least four supporting members (10, 10.1, 10.2), wherein the ladder or box frame (30) comprises at least one supporting member (10, 10.1, 10.2) with an at least partially closed cross-section with at least a first and a second metal shell (5, 6) connected together at least in portions in the longitudinal direction (L), wherein the at least first and second metal shells (5, 6) each have at least one floor (5', 6') with two protruding uprights (5", 6") spaced apart from each other and connected integrally to the floor (5', 6').

Figure 11:
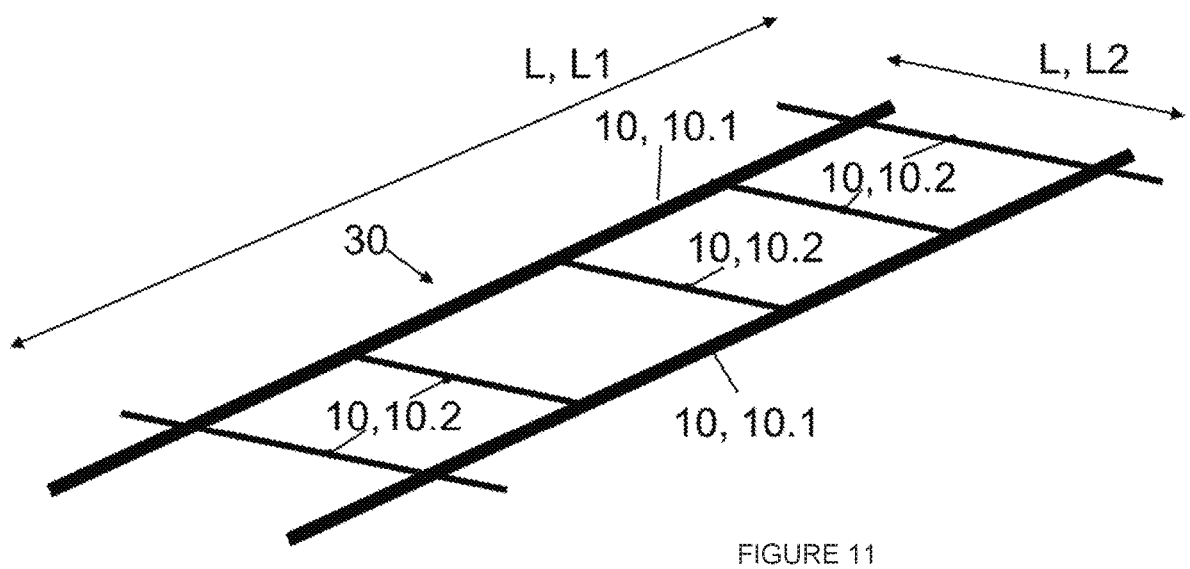
FIG. 11 is an exemplary embodiment of a ladder frame or box frame in diagrammatic, perspective view.

FIG. 11 shows diagrammatically in perspective view a design of a ladder frame or box frame (30) in the form of a ladder frame, in particular for an SUV. The ladder or box frame (30) comprises two supporting members (10) in the form of longitudinal members (10.1) which extend spaced apart from each other over a finite dimension, and are connected together via five supporting members (10) in the form of cross-members (10.2) which are attached by substance-bonding joining techniques, in particular MAG welding. The cross-members (10, 10.2) may be formed for example from a rolled profile with an at least partially closed cross-section. The longitudinal members (10, 10.1) are preferably formed as closed profiles, wherein the metal shells (5, 6) used to produce the longitudinal members (10, 10.1) have undergone the at least two-stage process. Also, at least one, several or all cross-members (10, 10.2) may alternatively also have an at least partially closed profile with correspondingly produced metal shells (5, 6). The cross-members may however also have different cross-sectional forms. Further components, such as for example reinforcement and/or bracing, connecting brackets for receiving vehicle components, such as for example engine, transmission, axles and vehicle superstructure, which may be connected or attached to the supporting members (10, 10.1, 10.2), are not shown here.

The invention is not restricted to the embodiments shown. The features described may all be combined with each other. In particular, the width of the floor and the height of the upright(s) of the at least first and/or second metal shell may vary individually in the longitudinal direction (L). Furthermore, the uprights may be configured individually. The individually formed uprights may have cross-sections adapted to the load and installation space situation, wherein in particular supporting members (10, 10.1, 10.2) can be produced which have cross-sections which vary in the longitudinal direction (L) and are partially and preferably completely closed. Irrespective of the geometry of the uprights, either oriented obliquely or perpendicularly to the floor or having a different shape, simple tolerance compensation is possible in particular in the width of the supporting member, and in particular the half shells may be partially nested into each other without hindering the joining situation. The overlap region (12) in particular allows joining with and without additional material.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method for production of a supporting member with a closed cross-section, having at least a first metal shell and a second metal shell which are connected together at least in portions in a longitudinal direction, wherein the method comprises the following steps:
providing at least a first and a second metal blank;
producing at least a first and a second metal shell from the respective first and second metal blanks, wherein the first and second metal shells each have at least one floor with two protruding uprights spaced apart from each other and integrally connected to the floor;
positioning the at least first and second metal shells such that the uprights of the metal shells come into overlapping contact in an overlap region at least in portions, forming a closed cross-section, and connecting together the at least first and second metal shells at least in portions in the longitudinal direction so as to form a supporting member;
wherein producing the at least first and second metal shells from the respective first and second metal blanks further comprises producing at least one preform having a floor with two uprights adjoining the floor from at least the first and/or second metal blank, wherein at least in regions, surplus metal material is provided in particular in the at least one preform; and
subjecting the at least one preform at least in regions to compression forming in order to produce the metal shells such that the uprights at least in portions have an opening angle of less than 6°
wherein the opening angle of the uprights of the first metal shell is, at least in portions and in the overlap region, different from the opening angle of the uprights of the second metal shell.

2. The method according to claim 1, wherein the opening angles are less than 3°.

3. The method according to claim 2, wherein the opening angles are less than 2°.

4. The method according to claim 1, wherein the at least one preform is produced in one or more steps, by at least one of deep-drawing, crash-forming, embossing and folding, and embossing and bending.

5. The method according to claim 1, wherein on production of the at least one preform, the uprights undergo substantially no alternating bending stresses.

6. The method according to claim 1, wherein the at least one preform has a substantially even distribution of surplus metal material.

7. The method according to claim 6 wherein surplus metal material is present at least in regions in the floor.

8. The method according to claim 6 wherein surplus metal material is present in at least one of the uprights and in a region between the uprights and floor.

9. The method according to claim 1, wherein surplus metal material is present at least in regions in the at least one preform, which on compression forming leads to a thickening of at least portions of an edge of the uprights of the metal shells in the longitudinal direction.

10. The method according to claim 1, wherein at least one of the first and second metal blanks is made from a steel material with a tensile strength of more than 350 MPa.

11. The method of claim 10 wherein the tensile strength is more than 400 MPa.

12. The method of claim 11 wherein the tensile strength is more than 500 MPa.

13. The method of claim 12 wherein the tensile strength is more than 600 MPa.

14. The method of claim 10 wherein at least one of the first and second metal blanks has a thickness of at least 0.8 mm.

15. The method of claim 14 wherein at least one of the first and second metal blanks has a thickness of at least 1.5 mm.

16. The method of claim 1 wherein at least one of the first and second metal shells has uprights of different heights.

17. The method according to claim 1, wherein the supporting member comprises at least two metal shells nested into or adjoining each other via the respective uprights, wherein the uprights run parallel to each other at least in portions in the overlap region for the connecting process.

18. A method for production of a ladder frame or box frame for a vehicle with at least four supporting members, wherein the ladder or box frame comprises at least one supporting member with a closed cross-section, with at least a first and a second metal shell connected to each other at least in portions in a longitudinal direction, wherein the at least first and second metal shells each comprise a floor with two protruding uprights spaced apart from each other and integrally connected to the floor, wherein at least one of the supporting members is produced according to claim 1.

* * * * *